United States Patent
Alcorn

(10) Patent No.: US 10,138,624 B1
(45) Date of Patent: Nov. 27, 2018

(54) ACTUATION APPARATUS

(71) Applicant: A. Shane Alcorn, Smithfield, UT (US)

(72) Inventor: A. Shane Alcorn, Smithfield, UT (US)

(*) Notice: Subject to any disclaimer, the term of this patent is extended or adjusted under 35 U.S.C. 154(b) by 151 days.

(21) Appl. No.: 15/011,903

(22) Filed: Feb. 1, 2016

Related U.S. Application Data

(60) Provisional application No. 62/111,711, filed on Feb. 4, 2015.

(51) Int. Cl.
*E03D 11/02* (2006.01)
*E03D 1/35* (2006.01)

(52) U.S. Cl.
CPC ..................... *E03D 1/35* (2013.01)

(58) Field of Classification Search
CPC .................. E03D 1/34; E03D 1/35
USPC ............................................. 4/427
See application file for complete search history.

(56) References Cited

U.S. PATENT DOCUMENTS

| | | | |
|---|---|---|---|
| 4,709,427 A | 12/1987 | Laverty | 4/427 |
| 4,891,864 A * | 1/1990 | Laverty, Jr. | E03D 3/02 137/624.12 |
| 4,974,264 A | 12/1990 | Brian | 4/300 |
| 5,768,719 A | 6/1998 | Harvey | 4/255.01 |
| 2005/0132483 A1* | 6/2005 | Butsch | E03D 1/00 4/427 |
| 2006/0096017 A1 | 5/2006 | Yamasaki et al. | 4/420 |
| 2008/0141447 A1* | 6/2008 | Bowcutt | E03D 11/00 4/427 |
| 2015/0247311 A1* | 9/2015 | Alcorn | E03D 11/02 4/427 |

* cited by examiner

*Primary Examiner* — Huyen Le
(74) *Attorney, Agent, or Firm* — Kunzler, PC

(57) ABSTRACT

The present invention is an actuation apparatus that is adapted such that when a water level sensor senses water at above a predetermined level by means of a float of a float valve "floating" or rising to a predetermined level based on a corresponding increase in a water level, a diaphragm valve "turns on" or repositions such that water is allowed to flow from a pressurized water source to an actuator and the actuator actuates. The apparatus may be used in conjunction with a toilet having auxiliary discharge path and valve in preventing the toilet from overflowing.

19 Claims, 3 Drawing Sheets

ACTUATION APPARATUS

CROSS REFERENCE TO RELATED APPLICATIONS

This U.S. nonprovisional utility patent application claims the benefit under 35 USC § 119(e) of U.S. provisional application No. 62/111,711 filed Feb. 4, 2015 which is expressly incorporated herein in its entirety by this reference.

FIELD OF THE INVENTION

The present invention relates to hydraulic actuation apparatuses and more especially to remotely actuating hydraulic actuation apparatuses that can be used in a toilet or the like to perform work based upon a sensed condition preferably without the use of electricity.

BACKGROUND OF THE INVENTION

Hydraulic actuation apparatuses which actuate and perform predetermined work based upon predetermined conditions are well known. An actuation apparatus is disclosed in U.S. patent application Ser. No. 14/630,378 which is incorporated herein in its entirety. However, such apparatuses typically require electronic sensors or actuators, or function to terminate actuation based on a predetermined water level.

SUMMARY OF THE INVENTION

The present invention is an actuation apparatus that includes a pressurized fluid source such as a pressurized water source, a hydraulic valve, a fluid level sensor, and an actuator. The hydraulic valve preferably defines a diaphragm valve, the fluid level sensor preferably defines a water level sensor in the form of a float valve, and the actuator preferably defines a hydraulic linear cylinder actuator (actuator) or the like. The apparatus is adapted such that when the water level sensor senses water at above a predetermined level by means of the float of the float valve "floating" or rising to a predetermined level based on a corresponding increase in a water level, the diaphragm valve "turns on" or repositions such that water is allowed to flow from the pressurized water source to the actuator and the actuator actuates. The apparatus is further adapted such that when the water level sensor senses water below a predetermined level by means of the float of the float valve "floating" or lowering to a predetermined level based on a corresponding decrease in a water level, the diaphragm valve "turns off" or repositions such that water is prevented from flowing from the pressurized water source to the actuator and the actuator actuates returns to a default position. An exemplary application of the apparatus is the incorporation of the apparatus in a toilet having an auxiliary discharge path such as that disclosed in U.S. provisional application 61/947,117 which is expressly incorporated herein in its entirety by reference.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature list is provided below. It is noted that like features are like numbered throughout all of the figures.

FEATURE TABLE

| # | Feature | # | Feature |
|---|---|---|---|
| 10 | Actuation apparatus | 12 | Pressurized water supply |
| 14 | Water supply valve | 16 | Water lines |
| 18 | Diaphragm valve | 20 | Float valve |
| 22 | Actuator | | |
| 30 | Actuation apparatus | 32 | Pressurized water supply |
| 34 | Water supply valve | 36 | Water lines |
| 38 | Diaphragm valve | 40 | Float valve |
| 42 | Actuator | 44 | Water dump port |
| 50 | Modular combination valve | 52 | Diaphragm valve |
| 54 | Float valve | 56 | Water lines |

Figure 1:
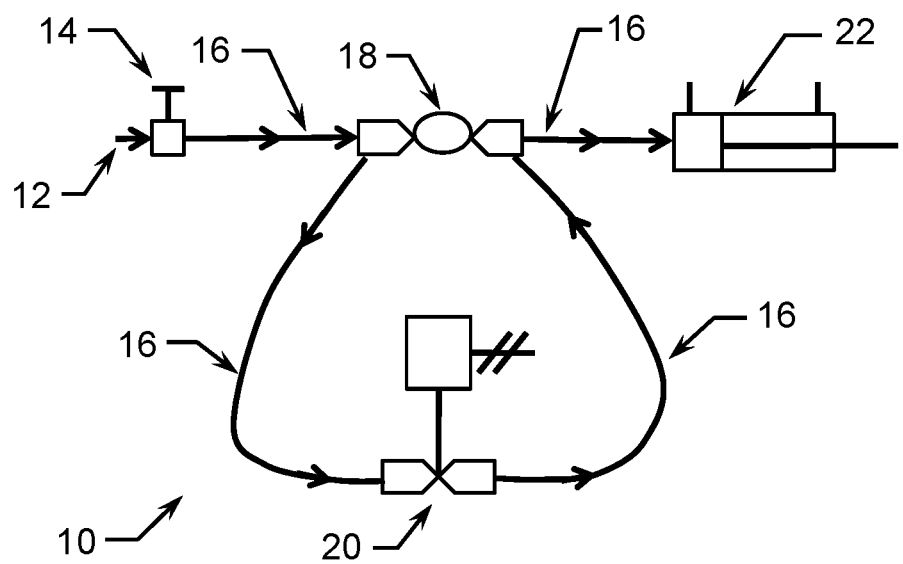
FIG. 1 is a schematic view of the actuation apparatus having a float valve return water line.

Referring now to the drawings and in particular to FIG. 1, a first embodiment of the invention is an actuation apparatus 10 having a pressurized water supply 12 which preferably includes a water supply valve 14, a plurality of water lines 16 (e.g. tubing or pipes) adapted to carry pressurized water, a diaphragm valve 18, a water level sensing float valve 20 (which alternatively may be a diaphragm valve), and an actuator 22 such as an linear cylinder actuator (which may be a single acting actuator or a double acting actuator). Actuation apparatus 10 is preferably configured such that a water line 16 is connected to pressurized water supply on a first end and to a first port of the diaphragm valve on a second end, a water line 16 is connected to a second port of diaphragm valve 18 on a first end and to a first port of float valve 20 on a second end, a water line 16 is connected to a second port of float valve 20 on a first end and to a third port of diaphragm valve 18 on a second end, and a water line 16 is connected to a fourth port of diaphragm valve 18 on a first end and to a first port of actuator 22 on a second end. It is noted that diaphragm valve 18, float valve 20, and actuator 22 may be arranged in close proximity to each other or in substantial distance from one another. For instance, apparatus 10 may be configured such that float valve 20 senses a water level that is substantially remotely located from diaphragm valve 18.

In a first embodiment in practice, actuation apparatus 10 is adapted such that when water supply valve 14 is opened, pressurized water 12 is supplied to float valve 20 via diaphragm valve 18. In a nominal or default position when the float of float valve 20 is below a predetermined level, float valve 20 remains closed. However, when water rises above a predetermined level causing the float of float valve 20 to rise above a predetermined level, float valve 20 opens and remains open while the float of float valve 20 remains above a predetermined level. Opening of float valve 20 causes pressurized water 12 to flow to diaphragm valve 18, which in turn causes pressurized water 12 to flow from diaphragm valve 18 to actuator 22. Pressurized water 12 flowing to actuator 22 causes actuator 22 to actuate and perform work. Upon closing of float valve 20, pressurized water 12 ceases to flow from float valve 20 to diaphragm valve 18 and from diaphragm valve 18 to actuator 22, and actuator 22 returns to a nominal or unactuated position.

Figure 2:
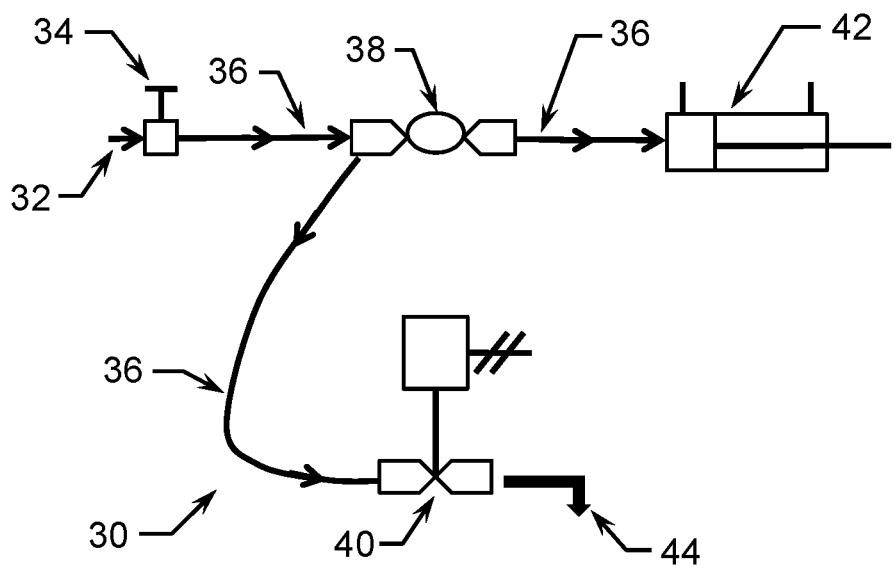
FIG. 2 is a schematic view of the actuation apparatus having a float valve water dump line.

Referring now to the drawings and in particular to FIG. 2, a second embodiment of the invention is an actuation apparatus 30 having a pressurized water supply 32 which preferably includes a water supply valve 34, a plurality of water lines 36 (e.g. tubing or pipes) adapted to carry pressurized water, a diaphragm valve 38, a water level sensing float valve 40 (which alternatively may be a diaphragm valve), an actuator 42 such as an linear cylinder actuator (which may be a single acting actuator or a double acting actuator), and a water dump port 44. Actuation apparatus 30 is preferably configured such that a water line 36 is connected to pressurized water supply 32 on a first end and to a first port of diaphragm valve 38 on a second end, a water line 36 is connected to a second port of diaphragm valve 38 on a first end and to a first port of float valve 40 on a second end, a water line 36 is connected to a second port of float valve 40 on a first end and to water dump port 44 on a second end, and a water line 36 is connected to a third port of diaphragm valve 38 on a first end and to a first port of actuator 42 on a second end. It is noted that diaphragm valve 38, float valve 40, and actuator 42 may be arranged in close proximity to each other or in substantial distance from one another. For instance, apparatus 30 may be configured such that float valve 40 senses a water level that is substantially remotely located from the diaphragm valve 38.

In a second embodiment in practice, actuation apparatus 30 is adapted such that when water supply valve 34 is opened, pressurized water 32 is supplied to float valve 40 via diaphragm valve 38. In a nominal or default position when the float of float valve 40 is below a predetermined level, float valve 40 remains closed. However, when water rises above a predetermined level causing the float of float valve 40 to rise above a predetermined level, float valve 40 opens and remains open while the float of float valve 40 remains above a predetermined level. Opening of float valve 40 causes pressurized water 32 to flow from diaphragm valve 38 to actuator 42 and a minimal amount of water 32 to flow to water dump port 44. Pressurized water 32 flowing to actuator 42 causes actuator 42 to actuate and perform work. Upon closing of float valve 40, pressurized water 32 ceases to flow from diaphragm valve 38 to actuator 42, and actuator 42 returns to a nominal or unactuated position, and water ceases to flow to water dump port 44.

Figure 3:
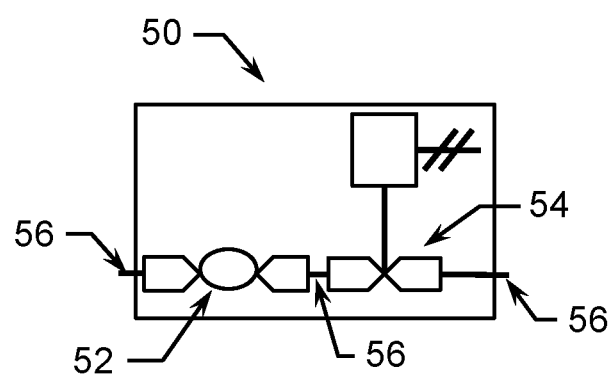
FIG. 3 is a schematic view of a modular combination float valve and diaphragm valve.

Referring now to the drawings and in particular to FIG. 3, an optional modular combination valve 50 having a diaphragm valve 52, a float valve 54, and a plurality of water lines 56 (e.g. tubing or pipes) adapted to carry pressurized water is disclosed. For original installation as well as maintenance, modular combination valve 50 is adapted such that modular combination valve 50 may be installed in an actuation apparatus and replaced in an actuation apparatus as a single combination of both a diaphragm valve and a float valve.

Figure 4:
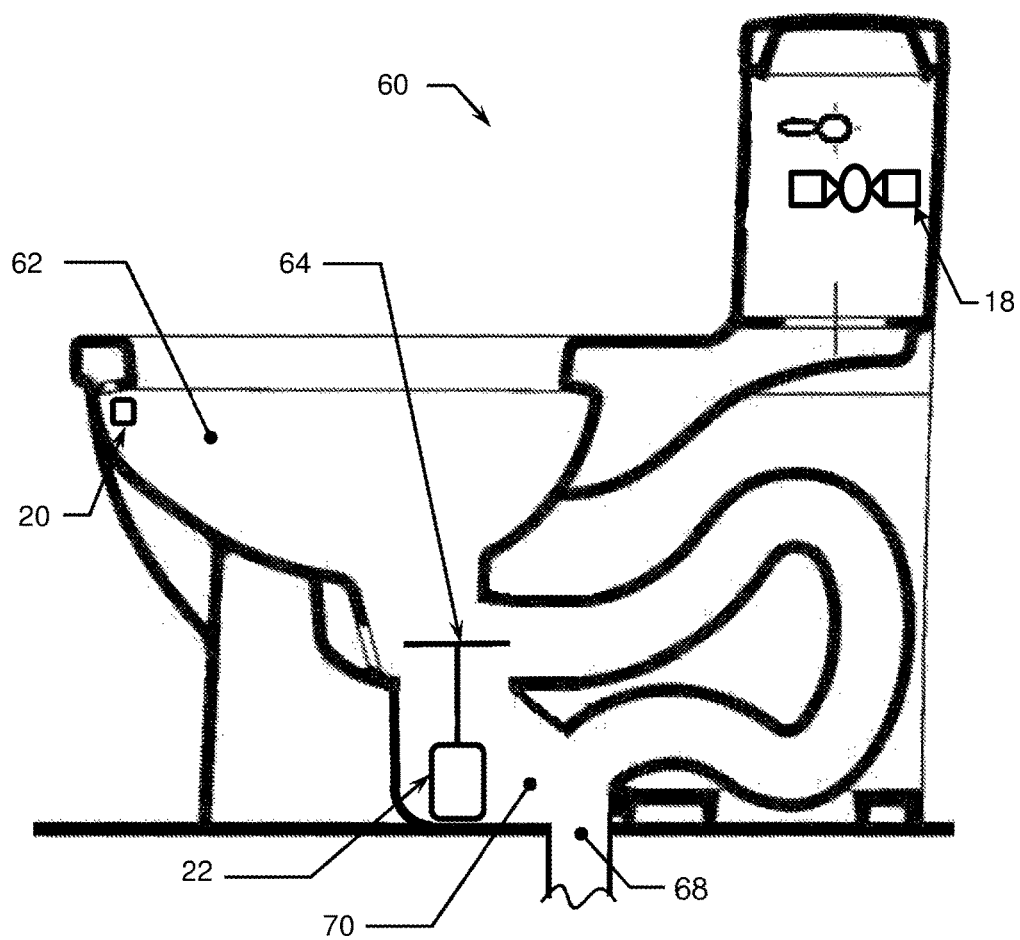
FIG. 4 is a schematic view of a toilet that includes an actuation apparatus.

In an exemplary application of the actuation apparatus shown in FIG. 4, the apparatus is positioned with and adapted for use in actuating a toilet 60 having an auxiliary discharge path such as that disclosed in U.S. patent application Ser. No. 14/630,378 (hereinafter "'378"). For instance, actuation apparatus 10 (or optionally actuation apparatus 30) is adapted to toilet apparatus 60 (10, 30, 50, 70 of '378) as follows. Float valve 20 is positioned in a cavity of toilet apparatus 60, preferably behind toilet bowl 62 (12, 32, 52, 72 of '378), wherein the cavity is subject of filling and draining of water substantially corresponding to the filling and draining of toilet bowl 62 with liquid (e.g. the fluid levels of both bowl 62 and the cavity of correspond substantially equally and substantially rise and fall together). Further, diaphragm valve 18 is positioned at a location of functional convenience within toilet apparatus 60 and actuator 22 (44 of '378) of auxiliary discharge valve 64 (22, 42, 62, 82 of '378). In practice, with pressurized water available to float valve 20 and diaphragm valve 18, float valve 20 remains closed absent the rise of the float of float valve 20 above a predetermined level. However, when fluid rises in bowl 62 above a predetermined level (but preferably below a level that would cause overflow of bowl 62), fluid correspondingly rises a predetermined level in the cavity of the toilet 60 causing the float of float valve 20 to rise above a predetermined level. Rising of the float of float valve 20 above a predetermined level causes float valve 20 to open and pressurized water to flow from diaphragm valve 18 to actuator 22, causing actuator 22 to actuate. Actuation of actuator 22 causes auxiliary discharge valve 64 to open allowing contents of bowl 62 to be emptied directly to sewer line 48 via the auxiliary discharge path 70 (20, 40, 60, 80 of '378). Upon the lowering of the fluid level in bowl 62 to below a predetermined level, fluid in the cavity of the toilet apparatus 60 lowers a corresponding amount causing the float of float valve 20 to lower below a predetermined amount. Lowering of float of float valve 20 to lower than a predetermined amount causes float valve 20 to close, causing water to cease to flow from float valve 20 and diaphragm valve 18 and causing actuator 22 to return to a nominal position and to close auxiliary discharge valve 64. By actuation apparatus 10 being thus adapted to toilet apparatus 60, not only is toilet apparatus 60 prevented from overflowing, but toilet apparatus 60 is prevented from overflowing without the use of any electronics (e.g. electronic sensor or actuators), and thus not only avoids electrical power consumption but provides for a more reliable toilet apparatus than would otherwise be available. Rather than separate stand-alone valves, in toilet apparatus 60, which incorporates actuation apparatus 10, float valve 20 and diaphragm valve 18 are preferably provided as modular combination valve 50 of FIG. 3, incorporating both a diaphragm valve and a float valve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An actuation apparatus having a float valve fluid level sensor and a hydraulic actuator, wherein said actuation apparatus is adapted such that when a float of said float valve fluid level sensor rises above a predetermined level, said float valve fluid level sensor opens a float valve and causes fluid to flow to said actuator and causes said actuator to actuate, wherein said actuation apparatus is connected to a toilet having an auxiliary discharge valve, an auxiliary discharge path, and a bowl, and wherein said float rises and falls corresponding substantially to a rise and fall of contents of said bowl, and wherein said actuation of said actuator causes said auxiliary discharge valve to open such that said contents of said bowl may flow through said auxiliary discharge path.

2. The apparatus of claim 1, wherein said float valve is combined with a diaphragm valve to form a modular combination float valve and diaphragm valve.

3. The apparatus of claim 1, wherein said apparatus includes a diaphragm valve, and wherein said float valve and said diaphragm valve are cooperatively positioned relative to each other in at least one of a close proximity position and a remote location position, and wherein said float valve is plumbingly connected to a dump port.

4. The apparatus of claim 1, wherein said auxiliary discharge path is larger than a primary discharge path of said toilet.

5. The apparatus of claim 1, wherein said float valve is positioned within the toilet, and wherein said actuator is adapted to open said auxiliary discharge valve when said actuator actuates.

6. The apparatus of claim 5, wherein rise of said float corresponds to a level of fluid in said bowl, and wherein said float valve is adapted such that said float rises above said predetermined level before fluid in said bowl can rise to a top of said bowl.

7. The apparatus of claim 5, wherein said float valve is combined with a diaphragm valve to form a modular combination float valve and diaphragm valve.

8. The apparatus of claim 5, wherein said float valve is plumbingly connected to a dump port.

9. An exclusively fluid powered non-electric actuation apparatus having a float valve fluid level sensor and a hydraulic actuator, wherein said apparatus is adapted such that when a float of said float valve rises above a predetermined level, said float valve opens and causes fluid to flow to said actuator and causes said actuator to actuate, wherein said actuator is connected to a toilet having an auxiliary discharge valve, an auxiliary discharge path, and a bowl, and wherein said actuator causes said auxiliary discharge valve to open such that contents of said bowl may flow through said auxiliary discharge path.

10. The apparatus of claim 9, wherein said float valve is combined with a diaphragm valve to form a modular combination float valve and diaphragm valve.

11. The apparatus of claim 9, wherein said apparatus includes a diaphragm valve, and wherein said float valve and said diaphragm valve are cooperatively positioned relative to each other in at least one of a close proximity position and a remote location position, and wherein said float valve is plumbingly connected to a dump port.

12. The apparatus of claim 9, wherein said apparatus is actuatingly connected to the toilet, and wherein said float rises and falls corresponding substantially to a rise and fall of said contents of said bowl.

13. The apparatus of claim 12, wherein said auxiliary discharge path is larger than a primary discharge path of said toilet.

14. The apparatus of claim 9, wherein said float valve is positioned within the toilet, and wherein said actuator is adapted to open said auxiliary discharge valve when said actuator actuates.

15. The apparatus of claim 14, wherein rise of said float corresponds to a level of fluid in said bowl, and wherein said float valve is adapted such that said float rises above said predetermined level before fluid in said bowl can rise to the top of said bowl.

16. The apparatus of claim 14, wherein said float valve is combined with a diaphragm valve to form a modular combination float valve and diaphragm valve.

17. The apparatus of claim 14, wherein said float valve is plumbingly connected to a dump port.

18. An actuation apparatus having a float valve fluid level sensor and a hydraulic actuator, wherein said actuation apparatus is adapted such that when a float of said float valve fluid level sensor rises above a predetermined level, said float valve fluid level sensor opens a float valve and causes fluid to flow to said actuator and causes said actuator to actuate, and wherein said apparatus is actuatingly connected to a toilet having an auxiliary discharge valve, an auxiliary discharge path, and a bowl, and wherein said float rises and falls corresponding substantially to a rise and fall of contents of said bowl, and wherein said actuation of said actuator causes said auxiliary discharge valve to open such that said contents of said bowl may flow through said auxiliary discharge path.

19. The apparatus of claim 18, wherein said float valve is adapted such that said float rises above said predetermined level before said contents in said bowl can rise to the top of said bowl.

* * * * *